Figure 5:
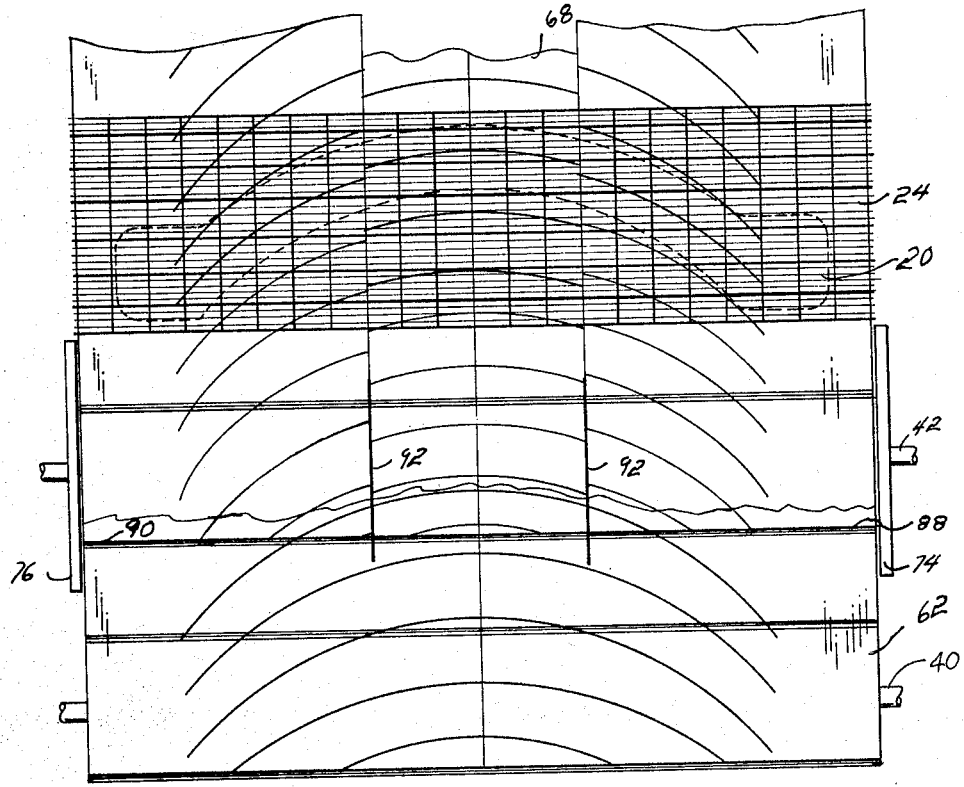

Nov. 15, 1966  A. E. REYNOLDS  3,285,512
GRAPHICAL CORNEAL CONTACT LENS COMPUTER
Filed Nov. 6, 1961  3 Sheets-Sheet 1
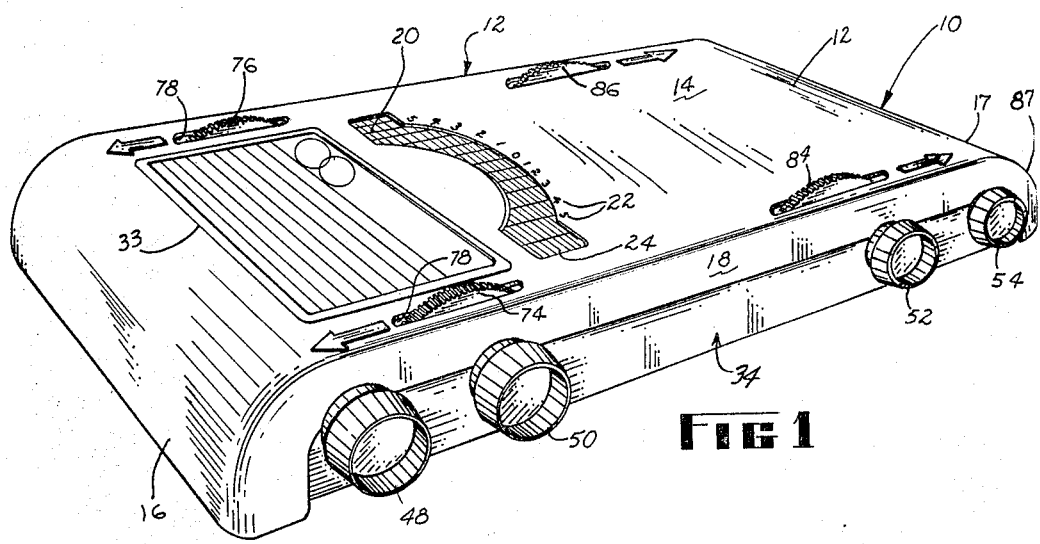
FIG 1
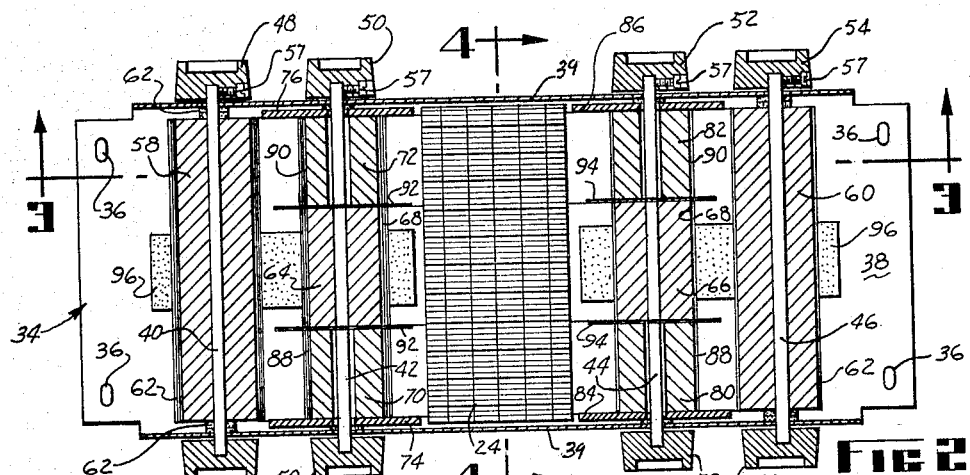
FIG 2
FIG 3
FIG 4
INVENTOR.
ALVIN EUGENE REYNOLDS
BY

INVENTOR.
ALVIN EUGENE REYNOLD
BY

INVENTOR.
ALVIN EUGENE REYNOLD

United States Patent Office 3,285,512
Patented Nov. 15, 1966

3,285,512
GRAPHICAL CORNEAL CONTACT LENS COMPUTER
Alvin E. Reynolds, Tulsa, Okla., assignor to The Plastic Contact Lens Company, Chicago, Ill., a corporation of Illinois
Filed Nov. 6, 1961, Ser. No. 150,314
2 Claims. (Cl. 235—61)

The present invention relates in general to apparatus for ascertaining the dimensioning of contact or corneal lenses, and more particular relates to a method and/or means for ascertaining the proper interior lens curvature of a corneal lens for best adaptation to a subject's eye.

While corneal lenses have bestowed considerable and unique benefits upon their users, their use and fitting have not been without considerable problems. These problems have arisen in part because the curvature of the cornea along the principal meridians may not follow a constant or equal radius and therefore the selection of a corresponding corneal lens curve has been a largely trial and error method.

Essentially, the present invention is directed to the selection of a lens which will provide the maximum in patient comfort with a minimum of repetitious trial and error fittings to accommodate the lens of the eye.

A comfortable corneal lens fitting usually requires that the lens ride on a lacrimal or tear layer in the neighborhood of .004 of an inch at the central portion of the cornea and which may vary between .002 and .006 of an inch over a diameter of about 7 mm. This provides good load distribution. Various points on the lens periphery may alternately touch or rest on the eye as the lens rocks or oscillates, but a clearance of .002 to .003 of an inch should be provided along the lens periphery to permit tear circulation. Adequate tear circulation is necessary to prevent discomfort, irritation or other harmful effect. In order to secure a lens with a large enough radius so as to accommodate a tear layer of .004" and yet with a radius of curvature sufficiently small to prevent excessive rocking or oscillation and misalignment of the central corneal lens portion with respect to the central portion of the cornea, considerable trial and error fittings must usually be performed.

To avoid the repetitious trial and error method of securing a corneal lens whose interior radius of curvature corresponds to the needs of the eye and secures the required tear layer, the present invention utilizes an arrangement whereby measurements representing the various corneal curvatures along the principal meridians may be plotted to construct a curve corresponding to the corneal curvature along a principal meridian. A second curve corresponding to a desired interior lens curvature may then be selected from a group to provide an instant picture of the relationship between any contemplated lens curvature and the eye. Thus, either one curve meeting the required corneal curvature may be selected to provide the proper fitting, or several curves may be selected so that a composite curve may be constructed to provide the necessary interior lens curvature.

The proper lens construction may thus be obtained in a minimum of time and with a maximum of economy.

It is therefore an object of the present invention to provide a corneal lens computer for quickly ascertaining graphically or otherwise the relationship between a corneal lens interior curvature and the corneal topography.

It is another object of the present invention to provide a method and/or apparatus for ascertaining the desired degree of curvature to be applied to the interior surface of a corneal lens for accommodating the lens to an eye with a predetermined lacrimal layer.

It is still a further object of the present invention to provide apparatus for ascertaining the interior curvature of a corneal lens so as to enable the lens to ride a tear layer of desired thickness without excessive movement so that the central corneal portions of the lens and eye remain aligned.

It is still a further object of this invention to provide for the graphic selection of a series of points corresponding to the topography of a cornea for comparison with respective points corresponding to a selected one of various internal corneal lens curvatures.

Figure 6:
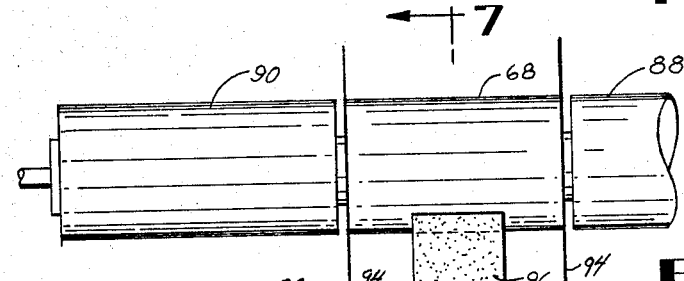
Figure 7:
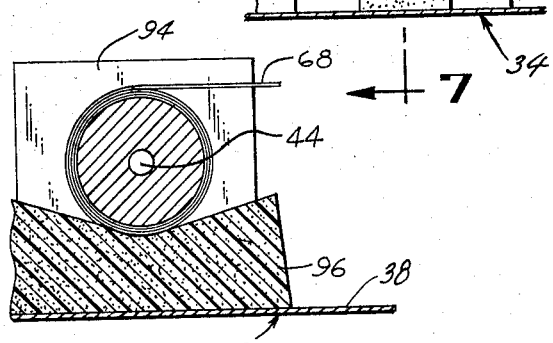
Figure 8:
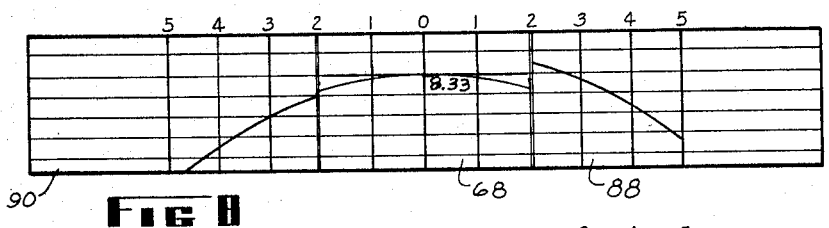
Figure 9:
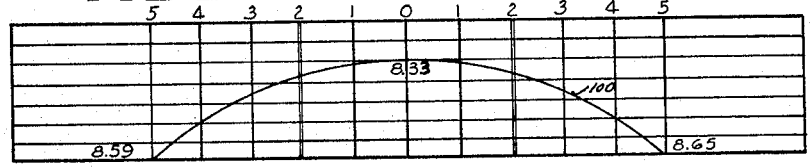
Figure 10:
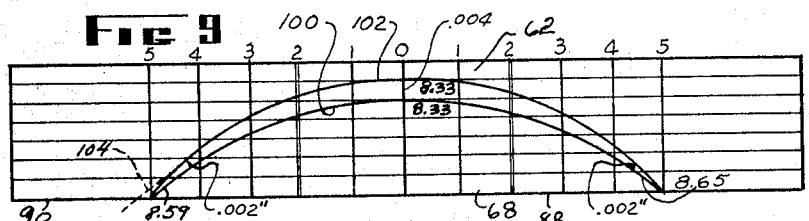
Figure 11:
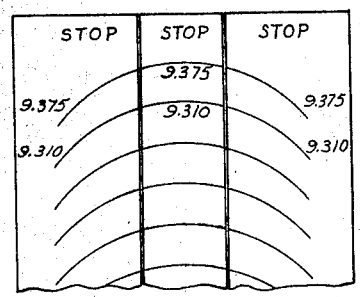
Figure 11:
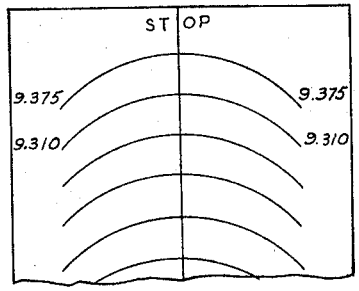
Figure 11:
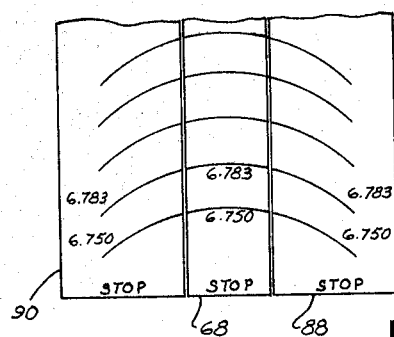
Figure 11:
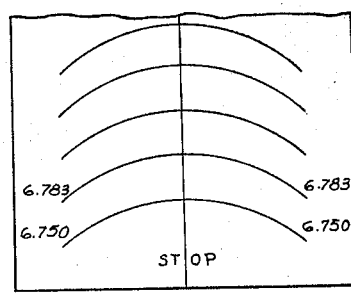

These and other objects of the present invention will become apparent on examination of the following specification, claims and drawings wherein:

FIGURE 1 is a perspective view of the corneal lens computer of the present invention;
FIGURE 2 is a top cross-sectional view of the sheet carrier of the computer taken along the line 2—2 in FIGURE 3.
FIGURE 3 is a cross-sectional view of the computer taken along the line 3—3 in FIGURE 2;
FIGURE 4 is a sectional view of the sheet carrier taken along the line 4—4 in FIGURE 2;
FIGURE 5 is a top elevational view of a portion of the sheet arrangement for illustrating the relative positions of the sheets;
FIGURE 6 illustrates a detail view of the relative roller positions on the central shafts;
FIGURE 7 is a cross-sectional view taken along the line 7—7 in FIGURE 6;
FIGURES 8–10 illustrate various steps in the selection of a proper lens curvature; and
FIGURE 11 illustrates the range of curves on the various sheets.

In FIGURE 1, a corneal lens computer is indicated by the reference character 10. It comprises a housing 12 having a top wall 14 and curved end walls 16 and 17 with a lip or flange 18 forming a side wall. A window 20 is provided in the top wall 14 and suitable markings or indicators 22 are provided adjacent thereto for indicating the longitudinal relationship of various curves in mm. at ten times scale. The zero marking represents the center of the cornea and the markings to the right and left thereof indicate the number of mm. from the center. Beneath the window 20 may be seen a coordinate grid array 24 which is visible due to the transparent nature of a plurality of corneal curve bearing sheets to be described which overlie the grid 24. The grid intersections represent .004" or .1 mm. at ten times scale. In addition, a chart holder 33 for holding charts indicating diopter conversion tables is shown on the top wall 14.

Either the end walls 16 and 17 or the side walls 18 of the housing 12 have suitable horizontal flanges not shown, which permit the housing 12 to be fastened to a sheet carrier 34 at the apertures 36 seen in FIGURE 2. The sheet carrier 34 comprises a flat wall 38 having upstanding or vertical flanges or walls 39 along opposite longitudinal edges. The walls 39 are received within the confines of side walls 18 and they are suitably apertured to receive the shafts 40, 42, 44 and 46.

The shaft 40 has mounted on opposite ends thereof a pair of knurled knobs 48; the shaft 42 has mounted on opposite ends thereof a pair of knurled knobs 50; the shaft 44 has mounted on opposite ends thereof a pair of knurled knobs 52 and the shaft 46 has mounted on opposite ends thereof a pair of knurled knobs 54. Each of the knobs is adapted to rotate the respective shaft by means of a respective coupling element such as the set screws 57.

Mounted on the respective shafts 40 and 46 is a respective sleeve or roller 58 and 60 and each extends substantially the entire distance between walls 39.

Respective friction washers 62 are provided between the rollers and walls 39. A transparent sheet 62 is enwrapped upon rollers 58 and 60 and its ends are secured to the rollers by means of an adhesive or other suitable arrangement. The sheet 62 is preferably of a transparent plastic material such as cellulose acetate and is imprinted with a series of curves representative of various internal corneal lens curvatures as shown in FIGURES 5 and 8–11. Markings indicating the radii of curvature in mm. are provided adjacent each curve. These curves are imprinted in progressively increasing radius from one end of the sheet 62 to the other and extend substantially across a range of about 6 mm. on either side of the zero line indicated at markings 22. They may be selectively brought into view through window 20 and seen against the grid 24 by rotating one of the pair of knobs 48 to wrap the sheet on roller 58 while unwinding from roller 60, or vice versa by rotating one of the knobs 54.

The shafts 42 and 44 have mounted centrally thereon a respective short roller 64 and 66 which rotate with the respective shafts. The rollers 64 and 66 are also enwrapped with a plastic sheet 68 similar to sheet 62 except in dimension, and having imprinted thereon a series of curves representing central corneal portions of different curvature. The curves on sheet 68 thus extend between the two rollers 64 and 66 and underlie the central portion of sheet 62 for a distance up to about 2 mm. on either side of the zero or center line of markings 22. Sheet 68 may be moved with respect to sheet 62 by knobs 50 and 52 in either direction in a manner similar to that explained for sheet 62.

Also mounted on shaft 42 are a pair of rollers 70 and 72 on respective sides of roller 64. Rollers 70 and 72 do not rotate with shaft 42 but instead are rotated independently by a respective knurled knob 74 and 76 affixed thereto. The knobs 74 and 76 protrude through the respective apertures 78 in housing 12 to permit the rollers 70 and 72 to be operated. Similarly, rollers 80 and 82 are mounted on either side of roller 66 on shaft 44 and these rollers 80 and 82 are adapted to be operated independently of roller 66 by the respective knurled knobs 84 and 86.

Enwrapped on rollers 70 and 80 is a transparent sheet 88 whose ends are suitably fastened to the rollers. It is of similar material to the other sheets and is imprinted with a series of curves representing peripheral corneal curvatures. These may, for example, correspond to either various temporal or inferior peripheral corneal curvatures and may be selectively brought to view in window 20 beneath sheet 62 and adjacent the termination of the curves on sheet 68. Similarly, the rollers 72 and 82 have enwrapped thereon a sheet 90 upon which are marked curvatures corresponding, for example, to the superior or nasal peripheral corneal curves and these are selectively brought to view in window 20 beneath sheet 62 adjacent the other terminal of the curves on sheet 68 by the operation of knobs 84 or 86.

A pair of thin rigid sheetlike members 92 and 94 are mounted on each side of rollers 64 and 66 resectively and these serve as web guides for the sheets 68, 88 and 90 to insure their proper alignment. In addition, friction blocks 96 comprising a soft spongy material may be mounted on sheet carrier 38 to engage with the enwrapped portions of the sheets 62 and 68 to insure the sheets are held taut when pulled from any particular roller. Other means may also be employed.

Mounted on the sheet carrier intermediate the two shafts 42 and 44 and aligned with window 20 is the wood block 98. This block supports the grid 24 seen through the sheets and aids in supporting the sheets.

Operation of the computer 10 will be explained by reference to FIGURES 8–11. It will be appreciated, of course, that various readings are taken along the vertical meridian of the cornea to derive the radius of curvature in the central, superior and inferior regions. Corneal curvatures on the horizontal meridian are also derived for the central, temporal and nasal regions. The radius of curvature for the various regions along the meridians are derived in any well known manner either by ophthalmometer or keratometer type instruments and preferably with the photoelectronic-keratoscope otherwise known as the "PEK" Camera. The radius of curvature in the various corneal regions may normally range from 6.75 mm. to 9.375 mm. and the sheets 62, 68, 88 and 90 are accordingly imprinted with curves of corresponding radius as seen in FIGURE 11. The curves are imprinted at ten times scale in graduations of ¼ diopter with the radius in mm. marked alongside the respective curves.

If for example, a curvature of 8.33 mm. in the central portion of the cornea along the vertical meridian has been determined, knobs 50 and 52 are controlled to move sheet 68 in a desired direction until the curve marked 8.33 appears in window 20 as tangent to one of the horizontal reference lines of grid 24 as indicated in FIGURE 8. This curve may extend longitudinally over about 2 mm. to either side of the zero or center line.

Next, one of the peripheral curves, for example, the superior corneal portion, is dialed into position preferably on the right side by operation of knobs 74 and 84 to move sheet 88. Usually the flatter peripheral curve is set up on the right.

The selected curve may correspond to a reading of 8.65, for example, taken on the corresponding portion of the cornea, and is aligned endwise with curve 8.33 on sheet 68 as seen in FIGURE 9. Then the opposite or inferior peripheral curve setting is made in accordance with the reading taken on the cornea. The curve to be selected may be 8.59 mm., for example, and knobs 76 and 86 controlled accordingly to align the curve 8.59 on sheet 90 endwise with the other end of curve 8.33 on sheet 68. Thus, a composite curve 100 as shown in FIGURE 9 corresponding to the corneal curvature along the vertical meridian is created.

Next one of the curves on sheet 62 is selected for adjustment with respect to the composite curve. The operator of course uses his judgment on the initial selection, and, let it be assumed, tries curve 8.33 on the sheet 62. This curve 102 is moved until it is separated from curve 100 by a distance of .1 mm. or .004" along the zero line of window 20 as shown in FIGURE 10. It will be noted that this curve 102 leaves a clearance of about .002" between it and the composite curve 100 at a distance of 4.5 mm. on the right side of the zero line and a clearance of .002" at 4 to 4.5 mm. to the left side of the zero line, while the clearance does not fall substantially below .004" for about 3.5 mm. to either side of the zero line. Thus, a .004" clearance will be provided over a 7 mm. diameter and the lens will have at least .002" clearance up to about 9 mm. diameter so that clearance will exist between the lens edge and the eye to permit circulation. It will be noted that curve 100 touches curve 102 at about 5.0 mm. to the right of the zero line. A lens constructed with this curvature and, for example, only 9 mm. in diameter would rock no more than 1 mm. to either side of the zero line before touching the cornea. This situation gives satisfactory alignment of the central portions of the lens and eye. A curve of flatter radius, say 8.76 mm. can be selected for the edge or peripheral portions of the lens beyond, for example, 4.5 mm. on either side of the zero line as indicated by broken line 104 to provide a desired clearance at the lens periphery. This is done in the event a .002" clearance is not provided by a selected curve at 3.5 to 4.5 mm. from the zero line or to prevent a sharp juncture. Thus, an interior lens curvature may be constructed initially which will avoid danger of excessive oscillation while an adequate lacrimal or tear layer is maintained. As already indicated, it will be appreciated that in the event curve 102 failed to provide .002"–.006"

clearance at the lens periphery of 3.5 to 4.5 mm. on either side of the zero line and/or touched curve 100 at a distance of more than 1 mm. beyond the 3.5 to 4.5 mm. range that either another curve must be selected or the peripheral portion of curve 102 altered by other curve selections such as 104 to secure the necessary clearance and touch in the desired range of 3.5 to 4.5 mm.

The described procedures may now be repeated for the horizontal meridian if necessary and, on ascertaining the proper interior lens curve or curves for that meridian, the lens may be constructed accordingly, with extreme likelihood of successful fitting on the first try.

Some changes may be made in the construction and arrangement of the parts of my corneal lens computer without departing from the real spirit and purpose of my invention, and it is my intention to cover by my claims any modified forms of structure or use of mechanical equivalents which may reasonably be included within their scope.

I claim as my invention:

1. A graphical corneal contact lens computer comprising an elongated housing having a transverse viewing area, a plurality of elongated sheets mounted in said housing in superposed relationship, external means on said housing coupled to said sheets for individually moving each sheet longitudinally of said housing and said viewing area, a co-ordinate gride member mounted in alignment with said viewing area, a first one of said sheets having marked thereon in spaced apart position a plurality of curves each representing a different central corneal radius of curvature, a second pair of said sheets having marked thereon in spaced apart positions a plurality of curves with each curve of a respective sheet representing a different peripheral corneal radius of curvature, said first sheet and said second pair of said sheets being positioned in said housing so that the central curves are in edge abutting relationship to the peripheral curves, to construct a composite curve representing the corneal topography of a person to be fitted with a corneal lens, a third one of said sheets having marked thereon in spaced apart position a plurality of curves each representing an interior corneal lens curve, said sheets being transparent, and all of said curves and the co-ordinate grid being drawn to the same scale, whereby superposition of selected composite corneal curves and interior corneal lens curve in alignment with the grid member and the viewing area enables determination of central and peripheral corneal lens clearance.

2. The graphical corneal contact lens computer claimed in claim 1 wherein said external means are connected to a plurality of rollers within the housing upon which said sheets are wrapped.

References Cited by the Examiner

UNITED STATES PATENTS 2,279,795  4/1942  Nissel _____ 351—40
3,067,931  12/1962  Mosse _____ 235—61

OTHER REFERENCES

Cinefro: "The Importance of Thickness in Contact Lens Fitting," article in "Contacto," vol. 5, No. 3, March, 1961, pp. 101–107 cited.

DAVID H. RUBIN, *Primary Examiner.*

UNITED STATES PATENT OFFICE
CERTIFICATE OF CORRECTION

Patent No. 3,285,512                                    November 15, 1966

Alvin E. Reynolds

It is hereby certified that error appears in the above numbered patent requiring correction and that the said Letters Patent should read as corrected below.

Column 3, line 61, for "resectively" read -- respectively --; column 5, line 27, for "gride" read -- grid --.

Signed and sealed this 5th day of September 1967.

(SEAL)
Attest:

ERNEST W. SWIDER                               EDWARD J. BRENNER
Attesting Officer                                    Commissioner of Patents